United States Patent
Kim et al.

(10) Patent No.: US 12,216,914 B2
(45) Date of Patent: Feb. 4, 2025

(54) APPARATUS AND METHOD FOR POWER-LOSS DATA PROTECTION IN A SYSTEM

(71) Applicant: SK hynix Inc., Gyeonggi-do (KR)

(72) Inventors: Jin Pyo Kim, Gyeonggi-do (KR); Ju Hyun Kim, Gyeonggi-do (KR); Jong Soon Park, Gyeonggi-do (KR); Woong Sik Shin, Gyeonggi-do (KR); Woo Young Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 123 days.

(21) Appl. No.: 17/958,498

(22) Filed: Oct. 3, 2022

(65) Prior Publication Data
US 2023/0333750 A1    Oct. 19, 2023

(30) Foreign Application Priority Data

Apr. 15, 2022  (KR) .................. 10-2022-0046949

(51) Int. Cl.
*G06F 3/06* (2006.01)
*G06F 12/02* (2006.01)

(52) U.S. Cl.
CPC .......... *G06F 3/0619* (2013.01); *G06F 3/0659* (2013.01); *G06F 3/0679* (2013.01); *G06F 12/0253* (2013.01); *G06F 2212/1032* (2013.01)

(58) Field of Classification Search
CPC .... G06F 3/0619; G06F 3/0659; G06F 3/0679; G06F 12/0253; G06F 2212/1032
See application file for complete search history.

(56) References Cited

U.S. PATENT DOCUMENTS

| | | | |
|---|---|---|---|
| 6,567,892 B1 * | 5/2003 | Horst .................. | G06F 11/1076 711/111 |
| 8,627,012 B1 * | 1/2014 | Derbeko ............ | G06F 12/0868 707/657 |
| 11,294,807 B2 * | 4/2022 | Nagabhirava ....... | G06F 12/0804 |
| 2005/0117418 A1 * | 6/2005 | Jewell .................. | G11C 5/141 714/E11.138 |
| 2013/0297854 A1 * | 11/2013 | Gupta ................. | G06F 11/1441 711/E12.008 |
| 2019/0172537 A1 * | 6/2019 | Peddle ................ | G06F 12/0246 |
| 2022/0188242 A1 * | 6/2022 | Tanpairoj ............ | G06F 12/0811 |
| 2023/0297247 A1 * | 9/2023 | Kanno .................. | G06F 3/0679 711/154 |

FOREIGN PATENT DOCUMENTS

| | | |
|---|---|---|
| KR | 10-2019-0132003 A | 11/2019 |
| KR | 10-2020-0072081 A | 6/2020 |
| KR | 10-2020-0113047 A | 10/2020 |

* cited by examiner

*Primary Examiner* — Gurtej Bansal
(74) *Attorney, Agent, or Firm* — IP & T GROUP LLP

(57) ABSTRACT

A memory system includes a memory device including a first memory block used for power-loss data protection and a controller coupled to the memory device. The controller includes a hardware layer and a firmware layer. The hardware layer checks whether at least one write data entry belongs to a programmable range in the memory device after power loss occurs, determines whether a logical address associated with the at least one write data entry is repeated, and programs the at least one write data entry in the first memory block.

18 Claims, 11 Drawing Sheets

APPARATUS AND METHOD FOR POWER-LOSS DATA PROTECTION IN A SYSTEM

CROSS-REFERENCE TO RELATED APPLICATIONS

This patent application claims the benefit of Korean Patent Application No. 10-2022-0046949, filed on Apr. 15, 2022, the entire disclosure of which is incorporated herein by reference.

TECHNICAL FIELD

One or more embodiments of the present disclosure described herein relate to a system including storage, a memory device, a memory system, and an operation method thereof, and more particularly, to an apparatus and a method for power-loss data protection.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data.

BRIEF DESCRIPTION OF THE DRAWINGS

The description herein makes reference to the accompanying drawings wherein like reference numerals refer to like parts throughout the figures.

DETAILED DESCRIPTION

Figure 1:
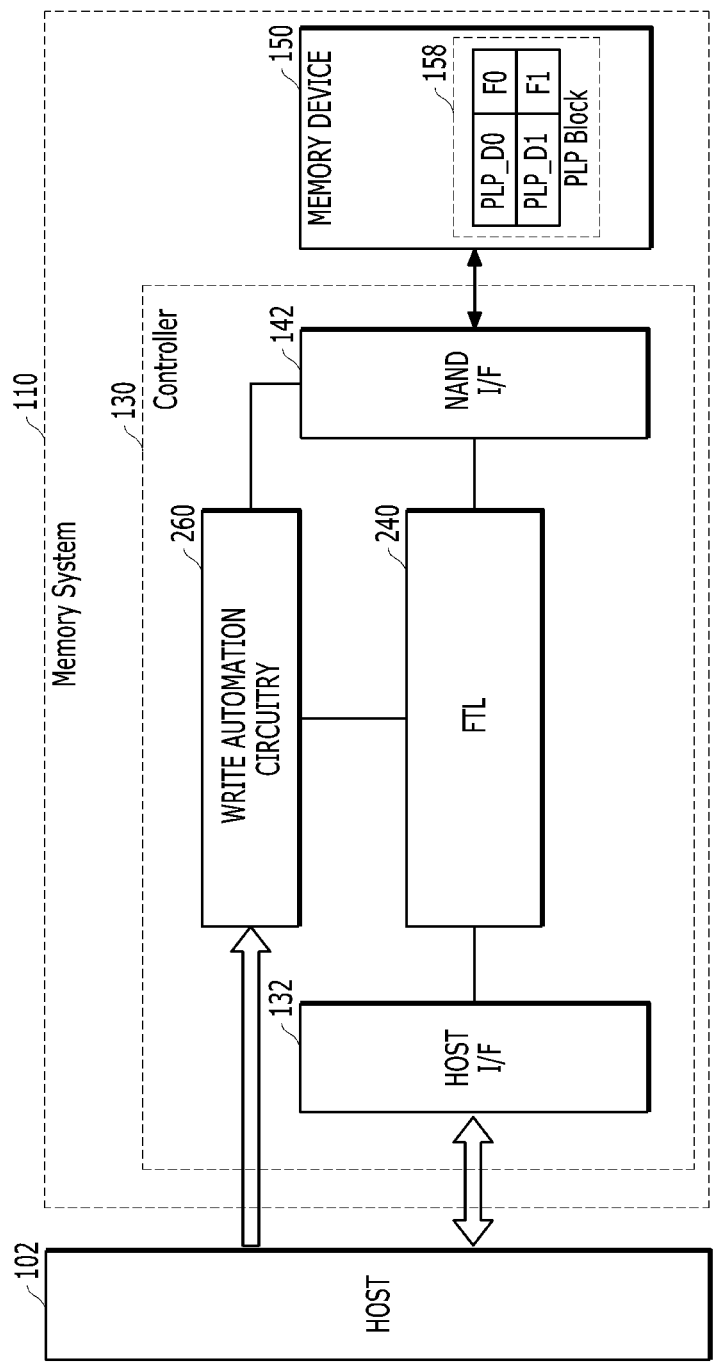
FIG. 1 illustrates a memory system according to an embodiment of the present disclosure.

Various embodiments of the present disclosure are described below with reference to the accompanying drawings. Elements and features of this disclosure may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. Furthermore, the terms in a claim do not foreclose the apparatus from including additional components, e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. The block/unit/circuit/component used with the "configured to" language include hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment in the present disclosure can provide a memory system, a data processing system, and an operation process or a method, which may quickly and reliably process data into a memory device by reducing operational complexity and performance degradation of the memory system, thereby enhancing usage efficiency of the memory device.

In an embodiment, a memory system can include a memory device including a first memory block used for power-loss data protection; and a controller coupled to the memory device, the controller including a hardware layer and a firmware layer, the hardware layer configured to: check whether at least one write data entry belongs to a programmable range in the memory device after power loss occurs; determine whether a logical address associated with the at least one write data entry is repeated; and program the at least one write data entry in the first memory block.

The hardware layer can include a first processor configured to determine whether the at least one write data entry belong to the programmable range; a second processor configured to determine whether the logical address associated with the at least one write data entry is repeated, set a tag to a write data entry associated with an old logical address of repeated logical addresses, divide or combine the at least one data entry to correspond to a program operation unit; a third processor configured to exclude the write data entry with the tag from a program data group and output the program data group of which size or amount is equal to or less than a threshold established for the memory device to perform a program operation for the power-loss data protection; and a fourth processor configured to transfer the program data group output from the third processor to a physical layer for transmission to the memory device.

The hardware layer can be further configured to receive a barrier message, informing that all write data entries associated with the power-loss data protection have been transmitted, and transmit the barrier message to the firmware layer. The firmware layer can be configured to determine whether a pending data entry is associated with the power-loss data protection in response to the barrier message and transfer the pending data entry to the hardware layer when the pending data entry is associated with the power-loss data protection.

The firmware layer can be configured to process a write data entry for a program operation. The controller can be configured to set an identifier to the write data entry completely processed by the firmware layer.

The first memory block can include plural pages, each page including a data region storing the write data entry and a spare region storing the identifier corresponding to the write data entry, the data region including plural memory cells, each memory cell storing 1-bit data.

The hardware layer can be further configured to determine whether data coherency regarding a data entry is checked during a data input/output operation when no power loss occurs. The firmware layer can be configured to process data entry for a read operation or a program operation when the data coherency regarding the data write item is checked. The hardware layer is configured to process the data entry for the read operation or the program operation when the data coherency regarding the data write item is not checked.

The data entry of which data coherency which is to be checked is associated with at least one of: a program operation following garbage collection; an unaligned program operation involving a Read/Modify/Write (RMW) operation; or a map data operation for updating, with a delay or conditionally, metadata which is stored in the memory device.

The hardware layer can be further configured to complete, when no power loss occurs, the data input/output operation regarding the write item after the firmware layer processes the data coherency regarding the data entry.

A program operation regarding the at least one write data entry can involve at least one of a map update or journaling. The hardware layer or the firmware layer is further configured to perform the map update or the journaling.

The hardware layer and the firmware layer can be configured to check a descriptor used for sharing information regarding the at least one write data entry to recognize handling, transfer, allocation, or release of the at least one write data entry.

The memory system can further include an auxiliary power supply unit configured to supply auxiliary power to the controller and the memory device when the power loss occurs.

The hardware layer can be further configured to store the at least one write data entry in the memory device, when the at least one write data entry is input from an external device and an early completion regarding the at least one write data entry is transmitted to the external device before the power loss occurs.

The controller can transmit early completion to the external device for the at least one write data entry which belongs to the programmable range which is preset for securely programming a size or an amount of write data in the memory device even though the power loss occurs.

The controller can be configured to read, when power is resumed after the power loss, the at least one write data entry and an identifier associated with the at least one write data entry from the first memory block. The controller is further configured to use at least one of the hardware layer or the firmware layer to perform a recovery operation regarding the at least one write data entry through based on the identifier.

The memory device can further include a second memory block including plural memory cells, each memory cell storing multi-bit data. The controller is further configured to program, in the second memory block, a write data entry generated through the recovery operation can be programmed in the second memory block.

In another embodiment, a method for operating a memory system can include performing a data input/output operation through a hardware layer and a firmware layer; and programming, through the hardware layer, at least one write data entry in a designated memory block after checking whether the at least one write data entry belongs to a programmable range in the memory device after power loss occurs and determining whether a logical address associated with the at least one write data entry is repeated.

The programming can include determining whether the at least one write data entry belong to the programmable range; determining whether the logical address associated with the at least one write data entry is repeated, setting a tag to a write data entry associated to an old logical address of repeated logical addresses, dividing or combining the at least one data entry to correspond to a program operation unit; excluding the write data entry with the tag from a program data group, outputting the program data group of which size or amount is equal to or less than a threshold established for the memory device to perform a program operation for the power-loss data protection; and transferring the program data group to a physical layer for transmission to the memory device.

The method can further include receiving, through the hardware layer, a barrier message informing that all write data entries associated with the power-loss data protection have been transmitted to transmit the barrier message to the firmware layer, and determining, the firmware layer, whether a pending data entry is associated with the power-loss data protection in response to the barrier message to transfer the pending data entry to the hardware layer when the pending data entry is associated with the power-loss data protection.

The programming can include generating an event for power-loss data protection after the power loss occurs; transferring information regarding a data input/output operation associated with a write data entry processed from the firmware layer to the hardware layer in response to the event; and programming the at least one write data entry, including the write data entry, collected by the hardware layer in the designated memory block.

The programming can further include setting an identifier to the write data entry when the write data entry is completely processed for a program operation through the firmware layer.

The method can further include recovering the at least one write data entry stored in the designated memory block when power is resumed after the power loss.

The recovering can include reading, when power is resumed after the power loss, the at least one write data entry and an identifier associated with the at least one write data entry from the designated memory block; and performing a recovery operation regarding the at least one write data entry through the hardware layer or the firmware layer based on the identifier.

In another embodiment, a controller can include a first unit consisting of firmware codes and suitable for causing one or more processors to transfer, from an external device, a first write command to a second unit; and the second unit consisting of hardware circuits and suitable for providing the first unit with the first write command. The first unit can be further suitable for causing the processors to process the first write command and to provide the first unit with a first result of the processing of the first write command. The second unit can be further suitable for controlling a memory device to store therein the first result. When a main power supply is interrupted, the second unit can be further suitable for transferring, from the external device, a second write command to the first unit, the first unit is further suitable for causing the processors to process the second write command while an auxiliary power supply is available and to provide the first unit with a second result of the processing of the second write command, the second result including an indicator whether the processing of the second write command is not yet completed. The second unit can be further suitable for: controlling the memory device to store therein the second result, ignoring data provided together with a trim command, and controlling the memory device to store therein a most recent piece among write data pieces corresponding to the same logical address. When the main power supply is restored, the first unit can be further suitable for causing the processors to complete the processing of the second write command based on the second result and to provide the first unit with a third result of the processing of the second write command. The second unit can be further suitable for controlling the memory device to store therein the third result.

An embodiment described herein can provide an apparatus and a method for improving a data input/output operation of a memory system or a data processing system.

Embodiments will now be described with reference to the accompanying drawings, wherein like numbers reference like elements.

FIG. 1 illustrates a memory system according to an embodiment of the present disclosure. The memory system 110 may store data or data entries and output the stored data or the stored data entries.

Referring to FIG. 1, the memory system 110 can include a memory device 150 including an area capable of storing data and a controller 130 configured to perform an operation for programming, deleting, or reading data in the memory device 150. Components included in the memory system 110 will be described below in detail with reference to FIGS. 2 to 3.

Referring to FIG. 1, when power loss occurs, the memory device 150 can include a first memory block (PLP Block) 158 used for power-loss protection (PLP) or power-loss data protection. Herein, the power-loss protection (PLP) or the power-loss data protection can include an operation that can store data which has not yet been stored in the memory device 150 when power loss occurs.

Figure 2:
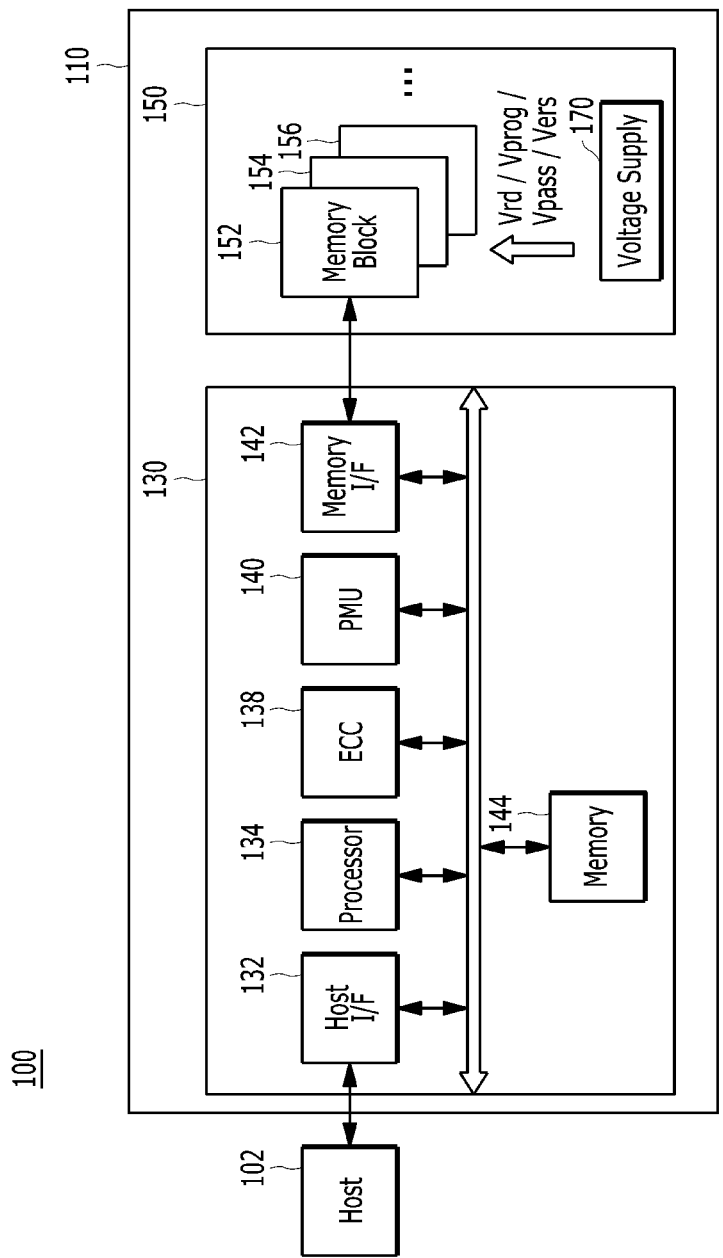
FIG. 2 illustrates a data processing system according to another embodiment of the present disclosure.

According to an embodiment, the first memory block 158 may be distinguished from a plurality of memory blocks 152, 154, 156 described in FIG. 2. The first memory block 158 and the plurality of memory blocks 152, 154, 156 can individually include a plurality of non-volatile memory cells. The first memory block 158 can include a non-volatile memory cell storing 1-bit data. However, the plurality of memory blocks 152, 154, 156 can include the non-volatile memory cells storing multi-bit data. A data input/output operation performed in the plurality of memory blocks 152, 154, 156 might be slower than that performed in the first memory block 158.

According to an embodiment, the controller 130 can designate at least one memory block among the plurality of memory blocks included in the memory device 150 as the first memory block 158. The controller 130 can change the first memory block 158, based on an operation state of the memory device 150, so that a physical block address (PBA) indicating the first memory block 158 in the memory device 150 could be changed.

According to an embodiment, the first memory block 158 can include a data region and a spare region. Write data entries PLP_D0, PLP_D1 can be programmed in the data region after a power loss occurs. Indicators F0, F1 corresponding to the write data entries PLP_D0, PLP_D1 can be programmed in the spare region. Here, the write data entries PLP_D0, PLP_D1 can include user data that is being processed by the controller 130 but not stored in the memory device 150 after a power loss occurs, meta data corresponding to the user data, or various data such as state information related to an operating state of the controller 130 or the memory device 150. The indicators F0, F1 corresponding to the write data entries PLP_D0, PLP_D1 can show processing states of the write data entries PLP_D0, PLP_D1 in the controller 130 when the power loss occurs.

According to an embodiment, the controller 130 can include a host interface 132, a memory interface 142, and a flash translation layer (FTL) 240. Also, the controller 130 can include a write automation circuit 260. The host interface 132 is for performing data communication between the memory system 110 and a host 102 which is an external device. The memory interface 142 is for performing data communication between the controller 130 and the memory device 150. Herein, the host interface 132 and the memory interface 142 will be described later with reference to FIGS. 2 to 3.

The flash translation layer (FTL) 240 and the write automation circuit 260 in the controller 130 can perform an operation performed in relation to data input/output between the host interface 132 and the memory interface 142. For example, the host 102 and the memory system 110 can use different address schemes. The flash translation layer 240 can perform address translation, which is an operation for converting a logical address transmitted through the host interface 132 into a physical address used in the memory device 150. Address translation is an example of operations that the flash translation layer 240 can perform. Plural operations that the flash translation layer 240 can perform will be described later with reference to FIG. 3.

According to an embodiment, the flash translation layer 240 can be implemented in firmware which is a type of computer software. The flash translation layer 240 implemented in firmware can be performed by the processor 134 shown in FIG. 2. Further, intelligent control can be embedded in the controller 130 in order to improve data input/output performance of the memory system 110, maintain or extend a lifespan of the memory device 150, or secure safety, reliability, and coherency of data stored in the memory system 110. It might be inefficient to implement such intelligent control as hardware. Accordingly, a logic or a module for the intelligent control might be implemented as firmware. The logic or the module for the intelligent control can be performed through the processor 134, as operations to be performed by the flash translation layer 240 become more complex and diverse. This structure in the controller 130 can be described as a firmware layer.

For example, the controller 130 can perform garbage collection on the memory device 150. The controller 130 can find a victim memory block with the lowest number of valid pages among a plurality of memory blocks included in the memory device 150, read only valid data from the victim memory block with the lowest number of valid pages, and then program the valid data in another memory block in the memory device 150. The victim memory block selected in this procedure is not preset, and the number of valid data or valid pages in the victim memory block is not preset either. The controller 130 can perform detailed operations for the garbage collection through intelligent control.

Some of operations performed by the controller 130 might not use intelligent control. For example, there is a case in which the data input/output operation can be performed according to a preset pattern, a regular routine, or a preset setting without considering an exceptional situation. For example, the memory device 150 can perform a data program operation in a unit of 1M byte. When new write data entries of a 1M byte, new logical addresses corresponding to the new write data entries, and a write command are input from the host 102, the controller 130 can transmit the new write data entries of 1M byte (as it is) to the memory device 150 for a program operation. Further, map information for the new write data entry can be added. Also, when new write data entries of 2M byte are transmitted from the host 102, the controller 130 can regularly divide the new write data entry of 2M byte into two write data of 1M byte and transmit the two write data to the memory device 150. Operations for programming such a write data entry in the memory device 150 can be performed according to a preset pattern or a regular routine while plural data input/output operations are performed by the controller 130. There are no exceptional or additional operations to secure safety, reliability, or coherency of the write data entries.

When the controller 130 does not have to use intelligent control for a data input/output operation, the data input/output operation is handled or processed through a write automation circuit 260 rather than through the firmware layer, in order to improve an operation speed of the data input/output operation. Here, the write automation circuit 260 can be considered a kind of hardware layer rather than the firmware layer. When the data input/output operation performed by the controller 130 is performed according to a preset pattern, a regular routine, or a preset setting and there is no need to consider an exceptional situation, control according to the preset pattern, the regular routine, or the present setting can be implemented to, and done through, hardware such as a circuit such as a field-programmable gate array (FPGA). The write automation circuit 260 can have a faster processing speed than the flash translation layer (FTL) 240. But it might be difficult for the write automation circuit 260 to perform an exceptional or additional operation.

The memory system 110 receiving a plurality of commands and a plurality of data entries from the host 102 can use a hardware layer or a firmware layer based on characteristics or attributes of the plurality of commands and the plurality of data entry in order to improve data input/output performance. According to an embodiment, the host interface 132 or the flash translation layer 240 can check or determine whether an exceptional or additional operation is expected for a specific command or a specific data entry, to determine whether or not an operation associated with the specific command or the specific data entry is processed by the write automation circuit 260. According to an embodiment, when transmitting a specific command or a specific data entry to the memory system 110, the host 102 can request processing through the write automation circuit 260 because an exceptional or additional operation might be unnecessary for the specific command or the specific data.

In an embodiment, based on characteristics or attributes of the data input/output operation, the memory system 110 can handle or process the data input/output operation in different ways through the flash translation layer (FTL) 240 and the write automation circuit 260. For example, the controller 130 can use the flash translation layer 240 to perform a write operation caused by garbage collection, an unaligned write operation accompanied by a read/modify/write (RMW) operation, and a map data update operation in which metadata for the user data stored in memory device 150 is updated with a delay or conditionally. On the other hand, the controller 130 can use the write automation circuit 260 to divide write data input from the host 102 into plural write data entries, each having a preset size or amounts, that can be stored in the memory device 150 and transfer the plural write data entries to at least one location (e.g., a blank page of open memory block) for a program operation performed in the memory device 150. Classification and execution of tasks performed by the controller 130 will be described later with reference to FIGS. 5 to 9.

A loss of power supplied to the memory system 110 might occur. Details of power loss will be described later with reference to FIG. 8. In order to protect data in response to the power loss, the memory system 110 can quickly store at least one write data entry, which has been not stored in the memory device 150, with limited power supplied from an auxiliary power supply. Because the hardware layer in the controller 130 can process a write data entry at a faster speed than the firmware layer, it might be efficient to process at least one write data entry to be programmed in the memory device 150 through the write automation circuit 260 rather than the flash translation layer (FTL) 240.

According to an embodiment, for the power-loss data protection, the hardware layer can include a circuit or a logic configured to check whether a logical address associated with at least one write data entry belonging to a logical address range corresponding to a trim command and determine whether the logical address is a repeated one among logical addresses previously processed for the power-loss data protection, based on the at least one write data entry and the logical address input from the host. Herein, the logical address range corresponding to the trim command can indicate an address range corresponding to an invalid data because the host 102 might no longer use data associated with the trim command. Through these processes, it is possible to reduce or avoid programming of an unnecessary or invalid write data entry in the memory device 150 during the power-loss data protection, so that the power-loss data protection can be performed more efficiently.

An operation of programming write data in the memory device 150 can include an operation of aligning the write data based on a page, which is a minimum unit for the program operation and an amount of the write data (e.g., an amount of flushed data flushed) which is programmed into the page including plural memory cells, each memory cell storing multi-bit data or single-bit data. When power loss occurs, the controller 130 can back up information regarding tasks and operations, which are not completely handled or processed before the power loss occurs, in the memory device 150. Herein, the tasks and the operations that are not completely handled or processed can include a task related to a data input/output operation performed by the controller 130. For example, the controller 130 can perform a task related to the data input/output operation before the power loss occurs through the flash translation layer (FTL) 240 and the write automation circuit 260.

When power loss occurs, the hardware layer such as the write automation circuit 260 can determine whether a size or an amount of at least one write data entry corresponds to a programmable range in the memory device. Herein, the programmable range can be determined based on power-loss data protection performance (e.g., a program operation speed, an auxiliary power, and the like) of the memory system 110 as well as an amount of protectable data (e.g., pending data entries which do not belong to a logical address range corresponding to the trim command). Also, after checking whether a logical address corresponding to the at least one write data entry is repeated, the hardware layer can store at least one remaining write data entry in a designated memory block in the memory block 150 after excluding a write data entry that does not need to be stored in the memory device 150 from the at least one write data entry. The controller 130 can transmit a task processed or handled through the flash translation layer (FTL) 240 into the write automation circuit 260. The write automation circuit 260 can transmit information regarding tasks, which are transmitted from the flash translation layer (FTL) 240 or processed or handled for itself, to the memory interface 142 for a program operation performed in the memory device 150. For example, referring to FIG. 11, the write automation circuit 260 can be implemented as a multi-processor.

According to an embodiment, the controller 130 can add the indicators F0, F1 in an operation of transferring a task performed through the flash translation layer (FTL) 240 to the write automation circuit 260. Before the power loss occurs, the flash translation layer 240 can handle or process a first task. The controller 130 can determine a first indicator F0 based on whether first task information PLP_D0 is completely handled or processed through the flash translation layer (FTL) 240. For example, when processing of the first task is completed by the flash translation layer 240, the first indicator F0 associated with the first task information PLP_D0 can be set to '0.' Otherwise, if the processing of the first task is not completed by the flash translation layer 240, the first indicator F0 can be set to '1'. The write automation circuit 260 can transmit the first task information PLP_D0 and the first indicator F0 to the memory interface 142. Then, the memory interface 142 can transfer the first task information PLP_D0 and the first indicator F0 to the memory device 150 for programming the first task information PLP_D0 and the first indicator F0 in the first memory block 158.

When the power loss occurs, an auxiliary power source included in the memory system 110 (e.g., an auxiliary power supply circuit 290 shown in FIG. 8) can be used. Auxiliary power can be temporarily usable for data backup. If a backup operation of the controller 130 would be performed long, the backup operation might not be completed. In order to increase a duration of the auxiliary power, a size of the auxiliary power source in the memory system 110 can become larger. But, when the size of the auxiliary power source is larger, a size of the memory system 110 could be increased. Further, a backup operation time that could be guaranteed for data backup by the auxiliary power source might be limited. For reducing the backup operation time, the controller 130 can transmit a task being processed through the flash translation layer 240 to the write automation circuit 260 after the power loss occurs. According to an embodiment, if the backup operation time is reduced, the auxiliary power source could be designed to be smaller in the memory system 110. Or, when the size of the auxiliary power source in the memory system 110 is not reduced, an amount of backup data for the power-loss data protection could be increased. Thus, safety, reliability, and coherency of data stored in the memory system 110 could be improved.

According to an embodiment, the memory system 110 can send an early completion to the host 102 which is a type of external device. For example, the early completion can be considered a type of response transferred by the memory system 110. The early completion can show that a program operation regarding a specific data entry input from the host 102 is completed in the memory system 110 even though the memory device 150 has not programmed the specific data entry yet. The memory system 110 can transfer the early completion regarding the specific data entry stored in a write buffer in the controller 130 to the external device in advance, when the specific data entry belongs to a range that could be guaranteed to be stored in the memory device 150 even when an emergency such as power loss occurs in the memory system 110. For example, when 100 data entries are stored in the write buffer in the controller 130 and it could be guaranteed that 80% of data stored in the write buffer is programmed in the memory device 150 based on performance of the memory system 110, the memory system 110 may notify the host 102 of early completion regarding 80 data entries out of the 100 data entries. According to an embodiment, the early completion determined based on the performance of the memory system 110 could be transferred to the host 102 even if a corresponding data entry has not been transferred from the controller 130 into the memory device 150. When the memory system 110 notifies an early completion in advance for a specific write command input from the host 102, the host 102 could consider that a data input/output operation speed of the memory system 110 might meet the host's requirement.

When the memory system 110 notifies the host 102 of an early completion for a specific data entry, the specific data entry has been not programmed in the memory device 150. Rather, the specific data entry could be stored in at least one of a data buffer in the memory system 110 or a program data buffer in the host 102. When the memory system 110 notifies the host 102 of the early completion for the specific data entry, the memory system 110 should complete a program operation for the corresponding data entry even if the power loss occurs. According to an embodiment, such a data entry can be preferentially backed up through the write automation circuit 260 after the power loss occurs.

In the memory system 110 according to an embodiment of the present disclosure, when the power loss occurs, the controller 130 can store a data entry that has not been stored in the memory device 150 including non-volatile memory cells, and then the controller 130 can restore a backup data stored in the memory device 150 after power is resumed.

In an embodiment, the controller 130 in the memory system 110 can include a hardware layer and a firmware layer to improve data input/output performance. A data input/output operation with intelligent control can be handled or processed through the firmware layer, or another data input/output operation with a regular routine or a preset pattern can be handled or processed through the hardware layer. When power loss occurs, the memory system 110 can transfer a task or an operation handled or processed through the firmware layer to the hardware layer so that the hardware layer handles or process the task or the operation for power-loss data protection. When the power loss occurs, the memory system 110 can use the hardware layer rather than the firmware layer for handing or processing a task or an operation to reduce a backup time regarding data which was being processed or handled in the controller 130. Accordingly, a size of the auxiliary power source included in the memory system 110 can be reduced, or an amount of data that could be backed up through the auxiliary power source can be increased.

In addition, the memory system 110 can assign or attach an identifier to operation data or information regarding a data input/output operation or a write data entry, which is handled or processed through the firmware layer, in order to record whether the processing through the firmware layer regarding the operation data or information or the write data entry has been completed before the power loss occurs. Based on the identifier, the memory system 110 can determine which of the hardware layer or the firmware layer handles or processes backup data for data protection or restoration when power is supplied or resumed after power loss. For example, when the backup data with the identifier indicating that the backup data relates to operation data which had been completely processed before the power loss, the memory system 110 can use the hardware layer for recovering or restoring the backup data in the memory device 150. Accordingly, the identifier can improve data safety or data coherency in the memory system.

Furthermore, when power loss occurs, the memory system 110 can backup data or information regarding a task or an operation handled or processed through the firmware layer to secure data coherency of data input/output operations. For example, the task or the operation can include at least one of a write operation caused by garbage collection, an unaligned write operation accompanied by a read, modify, and write (Read/Modify/Write, RMW) operation, or a map data update operation in which metadata regarding stored data entries is updated with a delay or conditionally in the memory device. The memory system 110 can restore or recover the data input/output operations based on backup data in the memory device, when power is supplied or resumed after power loss.

Hereinafter, descriptions will be made focusing on operations or components that can be technically distinguished between the controller 130 and the memory device 150 described in FIG. 1 and FIGS. 2 to 4. Specifically, a flash translation layer (FTL) 240 in the controller 130 will be described in more detail with reference to FIGS. 3 to 4. According to an embodiment, roles and functions of the flash translation layer (FTL) in the controller 130 may be varied.

Figure 3:
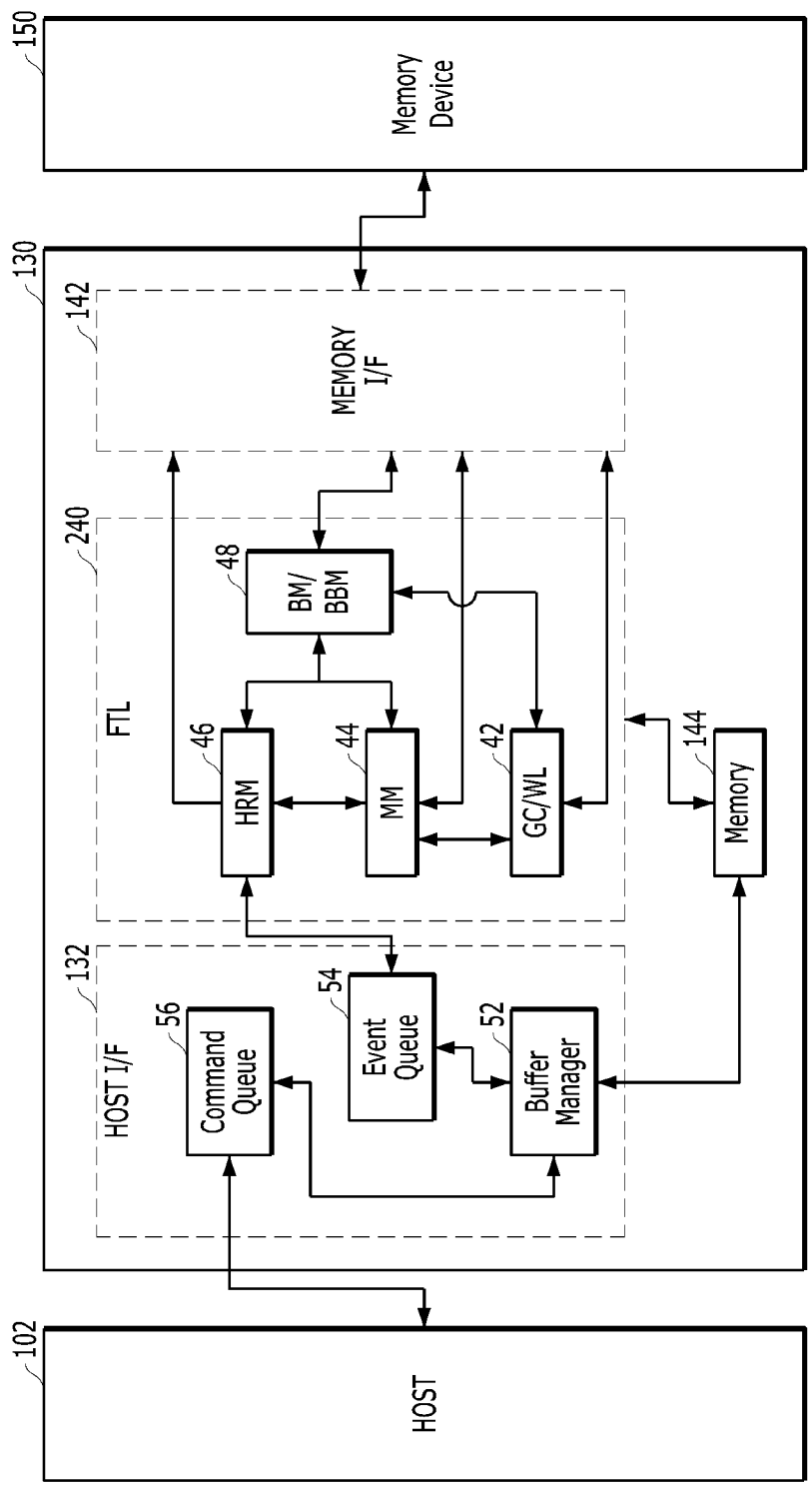
FIG. 3 illustrates a memory system according to another embodiment of the present disclosure.

FIGS. 2 and 3 illustrate some operations that may be performed by the memory system 110 according to one or more embodiments of the present disclosure.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

As shown in FIG. 2, the memory device 150 may include a plurality of memory blocks 152, 154, 156. The memory blocks 152, 154, 156 may be understood as a group of non-volatile memory cells in which data is removed together by a single erase operation. Although not illustrated, the memory block 152, 154, 156 may include a page which is a group of non-volatile memory cells that store data together during a single program operation or output data together during a single read operation. For example, one memory block may include a plurality of pages.

For example, the memory device 150 may include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells.

In addition, according to an embodiment, the memory die may include at least one memory plane. The memory die may be understood to be a set of components implemented on a physically distinguishable substrate. Each memory die may be connected to the controller 130 through a data path. Each memory die may include an interface to exchange an item of data and a signal with the controller 130.

According to an embodiment, the memory device 150 may include at least one memory block 152, 154, 156, at least one memory plane, or at least one memory die. The internal configuration of the memory device 150 shown in FIGS. 1 and 2 may be different according to performance of the memory system 110. An embodiment of the present disclosure is not limited to the internal configuration shown in FIG. 2.

Referring to FIG. 2, the memory device 150 may include a voltage supply circuit 170 capable of supplying at least some voltage into the memory block 152, 154, 156. The voltage supply circuit 170 may supply a read voltage Vrd, a program voltage Vprog, a pass voltage Vpass, or an erase voltage Vers into a non-volatile memory cell included in the memory block. For example, during a read operation for reading data stored in the non-volatile memory cell included in the memory block 152, 154, 156, the voltage supply circuit 170 may supply the read voltage Vrd into a selected non-volatile memory cell. During the program operation for storing data in the non-volatile memory cell included in the memory block 152, 154, 156, the voltage supply circuit 170 may supply the program voltage Vprog into a selected non-volatile memory cell. Also, during a read operation or a program operation performed on the selected nonvolatile memory cell, the voltage supply circuit 170 may supply a pass voltage Vpass into a non-selected nonvolatile memory cell. During the erasing operation for erasing data stored in the non-volatile memory cell included in the memory block 152, 154, 156, the voltage supply circuit 170 may supply the erase voltage Vers into the memory block.

The memory device 150 may store information regarding various voltages which are supplied to the memory block 152, 154, 156 based on which operation is performed. For example, when a non-volatile memory cell in the memory block 152, 154, 156 can store multi-bit data, plural levels of the read voltage Vrd for recognizing or reading the multi-bit data entry may be required. The memory device 150 may include a table including information corresponding to plural levels of the read voltage Vrd, corresponding to the multi-bit data entry. For example, the table can include bias values stored in a register, each bias value corresponding to a specific level of the read voltage Vrd. The number of bias values for the read voltage Vrd that is used for a read operation may be limited to a preset range. Also, the bias values can be quantized.

The host 102 may include a portable electronic device, e.g., a mobile phone, an MP3 player, a laptop computer, etc., or a non-portable electronic device, e.g., a desktop computer, a game player, a television, a projector, etc.

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility, e.g., a power saving function. The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to the plurality of commands within the memory system 110.

A controller 130 in the memory system 110 may control a memory device 150 in response to a request or a command input from the host 102. For example, the controller 130 may perform a read operation to provide data read from the memory device 150 to the host 102 and may perform a write operation (or a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface 132, a processor 134, the error correction circuitry (ECC) 138, a power management unit (PMU) 140, a memory interface 142, and a memory 144. Components included in the controller 130 as illustrated in FIG. 2 may vary according to structures, functions, operation performance, or the like, regarding the memory system 110.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood to be a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not, and outputs an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data entries. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above-described codes. The error correction circuitry 138 shown in FIG. 2 can include at least some of the components included in the controller 130 shown in FIG. 1.

For example, the ECC decoder may perform hard decision decoding or soft decision decoding on data transmitted from the memory device 150. The hard decision decoding can be understood as one of two methods broadly classified for error correction. The hard decision decoding may include an operation of correcting an error bit by reading digital data of '0' or '1' from a non-volatile memory cell in the memory device 150. Because the hard decision decoding handles a binary logic signal, the circuit/algorithm design or configuration may be simpler and a processing speed may be faster than the soft decision decoding.

The soft decision decoding may quantize a threshold voltage of a non-volatile memory cell in the memory device 150 by two or more quantized values, e.g., multiple bit data, approximate values, an analog value, and the like, in order to correct an error bit based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use a low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes can be understood as probabilistic decoding. In the hard decision decoding, a value output from a non-volatile memory cell is decoded as 0 or 1. Compared to the hard decision decoding, the soft decision decoding can determine the value stored in the non-volatile memory cell based on the stochastic information. Regarding bit-flipping which may be considered an error that can occur in the memory device 150, the soft decision decoding may provide improved probability of correcting the error and recovering data, as well as providing reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) for the soft decision decoding. The LDPC-CCs may have a scheme using a linear time encoding and a pipeline decoding based on a variable block length and a shift register.

According to an embodiment, the ECC decoder may use, for example, a Log Likelihood Ratio Turbo Code (LLR-TC) for the soft decision decoding. A Log Likelihood Ratio (LLR) may be calculated as a non-linear function for a distance between a sampled value and an ideal value. In addition, a Turbo Code (TC) may include a simple code, for example, a Hamming code, in two or three dimensions and repeat decoding in a row direction and a column direction to improve reliability of values.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data for operations performed in the memory system 110 and the controller 130. For example, the memory 144 may temporarily store read data entries output from the memory device 150 in response to a read request from the host 102 before the read data entries are output to the host 102. In addition, the controller 130 may temporarily store write data entries input from the host 102 in the memory 144 before programming the write data entries in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In addition to the read data entries or write data entries, the memory 144 may store information, e.g., map data, read requests, program requests, etc. used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150 in response to a write request or a read request entered from the host 102. According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 can perform foreground or background operations for reading, writing, or erasing data in the memory device 150. In addition, a parameter set operation corresponding to a set parameter command or a set feature command as a set command transmitted from the host 102 may be considered a foreground operation. Background operations that can be performed without a command transmitted from the host 102 by the controller 130 include garbage collection (GC), wear leveling (WL), bad block management for identifying and processing bad blocks, or the like.

According an embodiment, substantially similar operations may be performed as both the foreground operation and the background operation. For example, when the memory system 110 performs garbage collection in response to a request or a command input from the host 102 (e.g., Manual GC), the garbage collection can be considered a foreground operation. When the memory system 110 performs garbage collection independently of the host 102 (e.g., Auto GC), the garbage collection can be considered a background operation.

When the memory device 150 includes a plurality of dies (or a plurality of chips) each including a plurality of non-volatile memory cells, the controller 130 may perform parallel processing regarding plural requests or commands input from the host 102 in order to improve performance of the memory system 110. For example, the transmitted requests or commands may be divided into plural groups including at least some of a plurality of planes, a plurality of dies, or a plurality of chips included in the memory device 150, and the plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands can be performed simultaneously or in parallel in the plurality of dies or planes. Such a processing method or scheme can be considered to be an interleaving method. Because a data input/output speed of the memory system 110 increases by operating with the interleaving method, data I/O performance of the memory system 110 can be improved.

By way of example but not limitation, the controller 130 can recognize statuses of a plurality of channels (or ways) associated with the plurality of dies included in the memory device 150. The controller 130 may determine a status of each channel or each way as one of a busy status, a ready status, an active status, an idle status, a normal status, and an abnormal status. The determination of which channel or way an instruction (and/or a data) is delivered through by the controller can be associated with a physical block address. The controller 130 may refer to descriptors delivered from the memory device 150. The descriptors may include a block or page of parameters describing something about the memory device 150. The descriptors can have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

Referring to FIG. 2, the memory device 150 in the memory system 110 may include a plurality of memory blocks 152, 154, 156. Each of the plurality of memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages which is a group of non-volatile memory cells read or programmed together.

In one embodiment, each memory block 152, 154, or 156 may have a three-dimensional stack structure for a high integration. Further, the memory device 150 may include a plurality of dies, each die including a plurality of planes, each plane including the plurality of memory blocks 152, 154, 156. A configuration of the memory device 150 may be changed depending on performance of the memory system 110.

FIG. 2 illustrates the memory device 150 includes the plurality of memory blocks 152, 154, and 156. The plurality of memory blocks 152, 154, and 156 may be any of single-level cell (SLC) memory blocks, multi-level cell (MLC) memory blocks, or the like, according to the number of bits that can be stored in one memory cell. A SLC memory block includes a plurality of pages implemented by memory cells, each memory cell storing one bit of data. A SLC memory block may have higher data I/O operation performance and higher durability than the MLC memory block. The MLC memory block includes a plurality of pages implemented by memory cells, each memory cell storing multi-bit data, e.g., two or more bits of data. The MLC memory block may have larger storage capacity for the same space compared to the SLC memory block. The MLC memory block can be highly integrated in a view of storage capacity.

In an embodiment, the memory device 150 may be implemented with MLC memory blocks such as a double level cell (DLC) memory block, a triple-level cell (TLC) memory block, a quadruple-level cell (QLC) memory block, and a combination thereof. The DLC memory block may include a plurality of pages implemented by memory cells, each memory cell capable of storing 2-bit data. The TLC memory block can include a plurality of pages implemented by memory cells, each memory cell capable of storing 3-bit data. The QLC memory block can include a plurality of pages implemented by memory cells, each memory cell capable of storing 4-bit data. In another embodiment, the memory device 150 can be implemented with a block including a plurality of pages implemented by memory cells, each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. For example, the controller 130 may perform a data input/output operation with a higher speed when the MLC memory block is used as the SLC memory block. Thus, the controller 130 may use the MLC memory block as a SLC buffer to temporarily store data because the buffer may require a high data input/output speed for improving performance of the memory system 110.

Further, according to an embodiment, the controller 130 can program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing multi-bit data. For a MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored 1-bit data.

In an embodiment, the memory device 150 is embodied as a non-volatile memory such as a flash memory, for example, a NAND flash memory, a NOR flash memory, or the like. In another embodiment, the memory device 150 may be implemented by at least one of a phase change random access memory (PCRAM), a ferroelectrics random access memory (FRAM), a transfer torque random access memory (STT-RAM), and a spin transfer torque magnetic random access memory (STT-MRAM), or the like.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54. The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using multi-thread included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data stored in the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (OOB) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (HRM) 46 or the state manager 42. The map manager 44 may store the entire map table in the memory device 150, e.g., a flash/non-volatile memory, and cache mapping entries according to the storage capacity of the memory 144. When a map cache miss occurs while processing inquiry or update requests, the map manager 44 may send a read request to the memory interface 142 to load a relevant map table stored in the memory device 150. When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (HRM) 46 may program the latest version of the data for the same logical address of the page and concurrently issue an update request. When the state manager 42 requests the map update in a state in which the copying of the valid page(s) is not completed normally, the map manager 44 might not perform the map table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
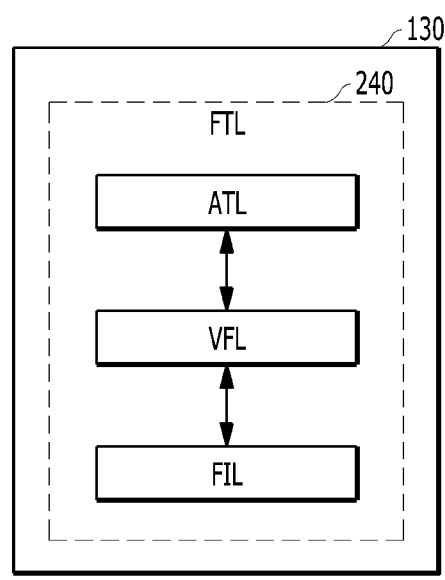
FIG. 4 illustrates internal configuration included in a controller shown in FIGS. 1 to 3 according to an embodiment of the present disclosure.

FIG. 4 illustrates internal configuration of the controller shown in FIGS. 1 to 3 according to an embodiment of the present disclosure.

Referring to FIG. 4, the flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL can perform an address translation process regarding a logical address space. That is, the address translation layer ATL can perform an address translation process based on mapping information in which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device. That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL can convert a virtual page address of the virtual flash layer VFL into a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
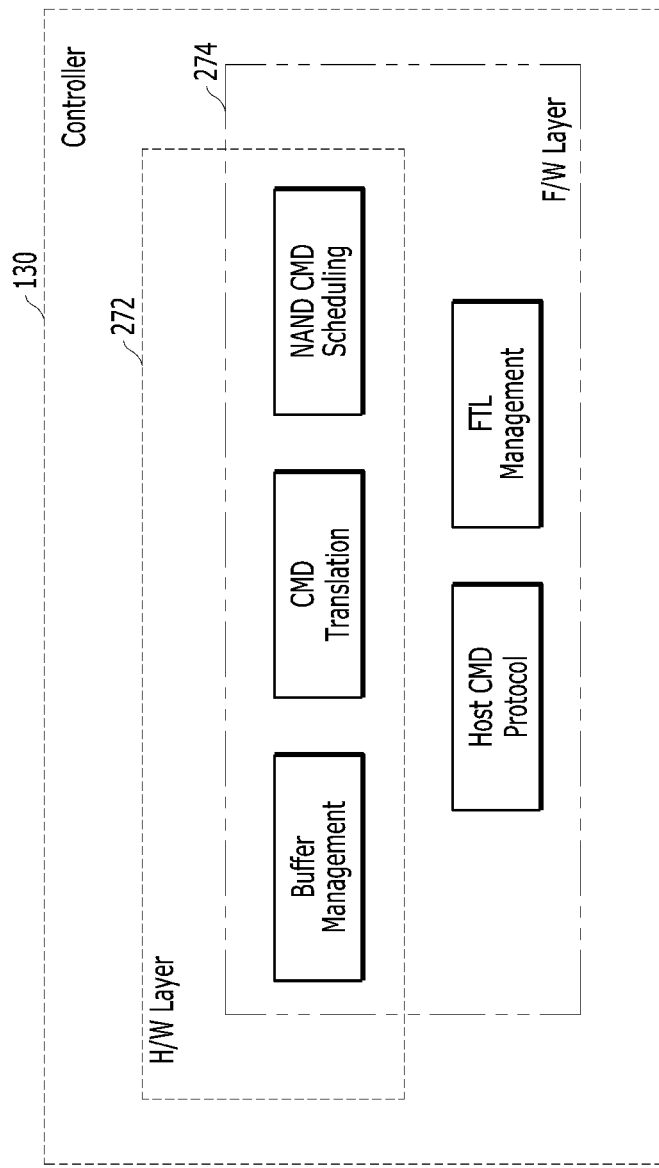
FIG. 5 illustrates a hardware layer and a firmware layer within the controller according to an embodiment of the present disclosure.

FIG. 5 illustrates a hardware layer and a firmware layer within the controller 130 according to an embodiment of the present disclosure.

Referring to FIG. 5, the controller 130 can include a hardware layer 272 and a firmware layer 274. Referring to FIGS. 1 to 5, a task with intelligent control among various tasks performed by the controller 130 can be handled or processed through the firmware layer 274. But a task without intelligent control can be handled or processed through the hardware layer 272.

Some of the tasks or operations performed in the controller 130 can place a heavy burden on the processor 134 during a data input/output operation. For example, the heavy burden might occur in tasks or operations involving Host Command Protocol, Buffer Management, Command Translation, Flash Translation Layer (FTL) Management, and NAND Command Scheduling.

As a size or an amount of data that can be stored by the memory system 110 increases and a task or an operation used for maintaining or improving performance of the memory system 110 increases, a bottleneck can occur while being performed through the firmware layer 274. Particularly, intelligent control can be implemented based on a lot of calculations or computations. When such calculations exceed a processing power or capability of the processor 134 described in FIG. 2, a bottleneck could occur, so that data input/output performance of the memory system 110 might be degraded. The number of cores of the processor 134 could be increased to avoid the bottleneck. However, increasing the number of cores of the processor 134 can increase participation of the processor 134, make a structure of the firmware more complicated, and increase power consumption. For these reasons, as the number of cores of the processor 134 increases, there might be a limit in improving performance of the controller 130. For example, when the number of cores of the processor 134 is greater than a preset number, the memory system 110 might reach a saturated state, so it might be hard to improve performance of the memory system 110.

According to an embodiment, the controller 130 in the memory system 110 can use the firmware layer 274 for processing or handling a task associated with host command processing (Host CMD Protocol) and flash translation layer management (FTL Management). On the other hand, the controller 130 can use the hardware layer 272 as well as the firmware layer 274 for processing or handling a task associated with buffer management, command translation, and NAND command scheduling. The controller 130 can have a structure according to the cross-layer design so that the controller 130 can use not only the firmware layer 274 but also the hardware layer 272 for processing or handling a specific task or a specific operation. A cross-layer designed structure of the firmware layer 274 and the hardware layer 272 can reduce loads and burdens of the processor 134. The cross-layer designed structure can bring a seamless operation/workflow of the firmware layer 274 and the hardware layer 272. Further the cross-layer designed structure may simplify a structure of the firmware layer 274. In addition, through the cross-layer designed structure, the controller 130 can reduce power consumption or handle or process more operations/tasks under the same power consumption, thereby improving performance of the controller 130.

According to an embodiment, the firmware layer 274 can have a shared data structure including all information regarding an atomic data unit processed or handled through the firmware layer 274 and the hardware layer 272. For example, the controller 130 uses a descriptor including all information regarding an atomic data unit processed or handled through each layer. In the controller 130 having the cross-layer designed structure, the hardware layer 272 can include a structure for descriptor pool management including descriptor allocation/release and queue management. The shared data structure of the controller 130 can support movement and transfer of operations/tasks data between the firmware layer 274 and the hardware layer 272.

Figure 6:
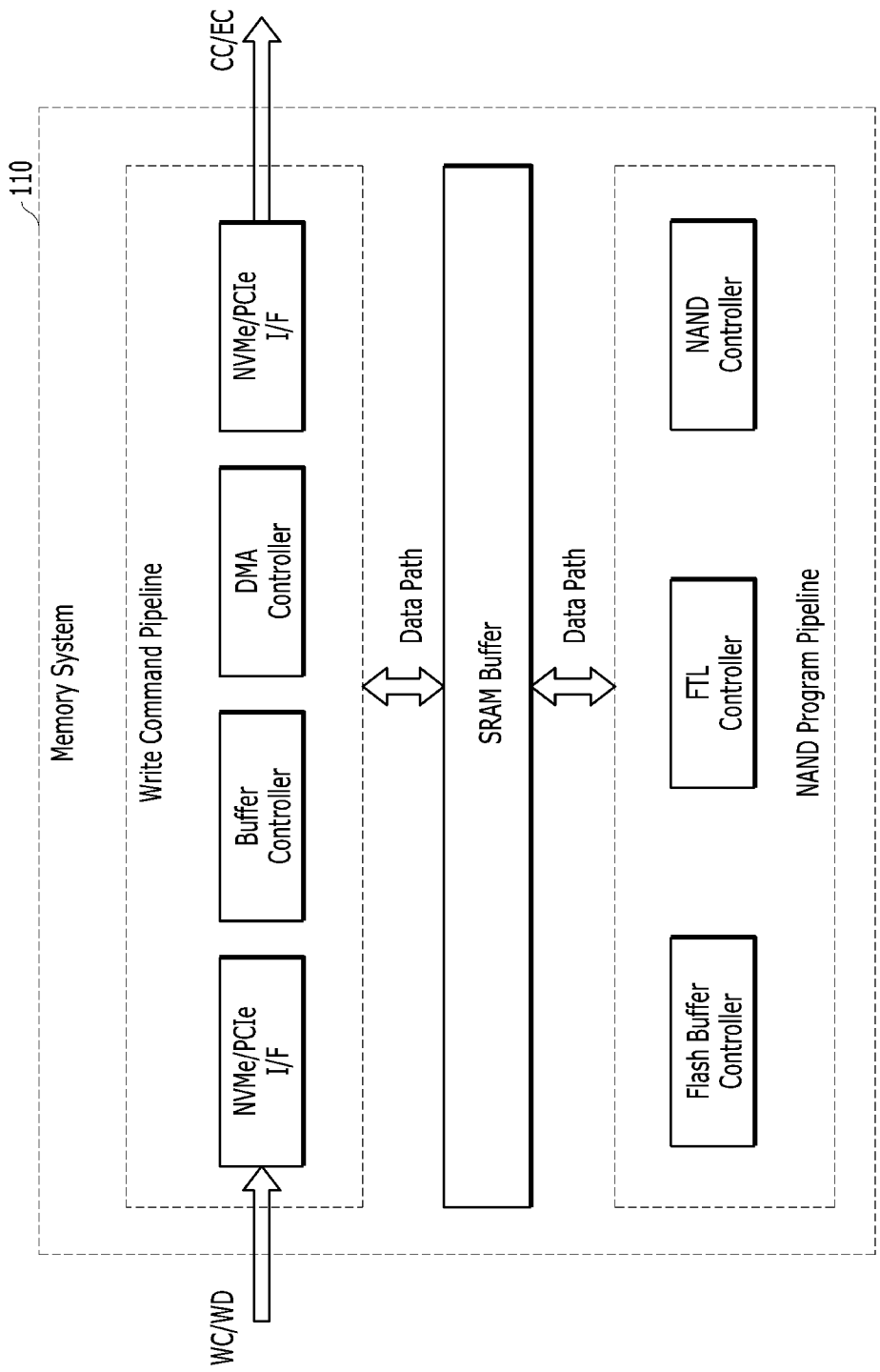
FIG. 6 illustrates an automated data path in a memory system according to embodiments of the present disclosure.

FIG. 6 illustrates an automated data path in a memory system according to embodiments of the present disclosure.

Referring to FIG. 6, the memory system 110 can receive a write command WC and write data WD from an external device. When the memory system 110 determines that the write data WD input in response to the write command WC has been programmed, or could be programmed, in the memory device 150, the memory system 110 can send a write completion (CC) or an early completion (EC) to an external device. A hardware layer capable of handling or processing a write command (WC) and write data (WD) in the memory system 110 can include a write command pipeline and a flash program pipeline (NAND Program Pipeline). The write command pipeline is used for handling or processing a task involving how to operate in response to a write command input from the external device, and the flash program pipeline is used for handing or processing a task for programming the write data in the memory device. The write command pipeline and the flash program pipeline can transfer the write data through a write buffer. For example, the write buffer can be implemented in SRAM. According to an embodiment, the write buffer can be implemented in the memory 144 described with reference to FIGS. 2 to 3. For example, the write buffer can be implemented in SRAM or DRAM.

The write command pipeline processing a write command can include an interface (e.g., NVMe/PCIe I/F) capable of receiving and recognizing the write command (WC) input from the external device and outputting write completion (CC) or early completion (EC) to the external device. For example, the interface (e.g., NVMe/PCIe I/F) is similar to the host interface 132 described in FIG. 2. For example, data communication between the external device and the memory system 110 can be performed through protocols of Peripheral Component Interconnect Express (PCIe) and Non-Volatile Memory Express (NVMe) interfaces. The interface (e.g., NVMe/PCIe I/F) can handle or process a transmitted write command (WC). Unlike an interface implemented in the firmware layer, it might be difficult to change or modify an interface implemented in the hardware layer when a protocol is changed after the memory system 110 is manufactured based on a specific protocol. Thus, the write command pipeline for processing a write command in the hardware layer according to an embodiment of the present disclosure could be designed to include a preset interface designed according to at least one protocol for supporting an operating environment where the memory system 110 is adopted, used, or applied (e.g., communication between the host 102 and the memory system 110).

When the interface (e.g., NVMe/PCIe I/F) recognizes the write command (WC), the recognized write command can be transmitted to a buffer controller. In response to the write command, the buffer controller can allocate a space or an area for storing the write data (WD) input along with the write command (WC). When the write data (WD) is stored in the write buffer (SRAM buffer), the flash program pipeline (NAND Program Pipeline) can be started to handle or process the write data (WD).

The flash buffer controller included in the flash program pipeline (NAND Program Pipeline) can check a buffer in the memory device 150. According to an embodiment, the flash buffer controller might check whether the buffer has an available space corresponding to the write data (WD) stored in the write buffer (SRAM Buffer) to determine whether the memory device 150 is ready to receive and store the write data (WD) transferred from the controller 130.

In an embodiment, the flash translation layer controller (FTL controller) can determine a position in which the write data (WD) is programmed among at least one possible position checked by the flash buffer controller. Unlike the flash translation layer 240 (refer to FIGS. 1 to 4) implemented in the firmware layer, the flash translation layer controller (FTL Controller) implemented in the hardware layer can assign a physical address for the write data (WD) based on a preset setting, a regular routine, or a preset pattern. In the firmware layer, the flash translation layer 240 can assign a physical address for the write data (WD) based on an operation environment of the memory system 110 or an operation state of the memory device 150 through intelligent control. But, in the hardware layer, the flash translation layer controller (FTL controller) can determine a position at which the write data (WD) is to be programmed in the memory device 150 based on a preset setting, a regular routine, or a preset pattern. Thereafter, the flash controller (NAND controller) can control the memory device 150 for programming the write data (WD) in a determined position of the memory device 150.

According to an embodiment, a direct memory access controller (DMA controller) included in the flash program pipeline (NAND Program Pipeline) can perform data communication with an external device. Unlike an interface included in the firmware layer, the direct memory access controller (DMA Controller) can prepare write completion (CC) or early completion (EC) regarding the write data (WD) to the external device without the involvement of the process 134 executing the firmware layer. The interface (NVMe/PCIe I/F) can handle or process the write completion (CC) or the early completion (EC) based on a preset communication protocol to transfer the writes complete (CC) or the early completion (EC), which is prepared by the direct memory access controller (DMA Controller), to an external device.

According to an embodiment, a data structure such as a queue can be included or arranged between an interface and a controller included in a write command pipeline for processing or handling the write command (WC) and a flash program pipeline (NAND Program Pipeline) for processing or handling a task associated with a program operation for the write data (WD). In each pipeline shown in FIG. 6, the write command (WC) and the write data (WD) which are handled or processed through the write command pipeline and the flash program pipeline (NAND Program Pipeline) can be delivered or transferred sequentially or stage by stage from a component or task to another component or task. The queue arranged between components or tasks can temporarily hold the write command (WC) or the write data (WD) to control a flow of the write command (WC) and the write data (WD). The write command pipeline and the flash program pipeline which process the write command (WC) and the write data (WD) in the hardware layer can provide a faster processing of tasks and operations than the flash translation layer 240 implemented in the firmware layer.

Figure 7:
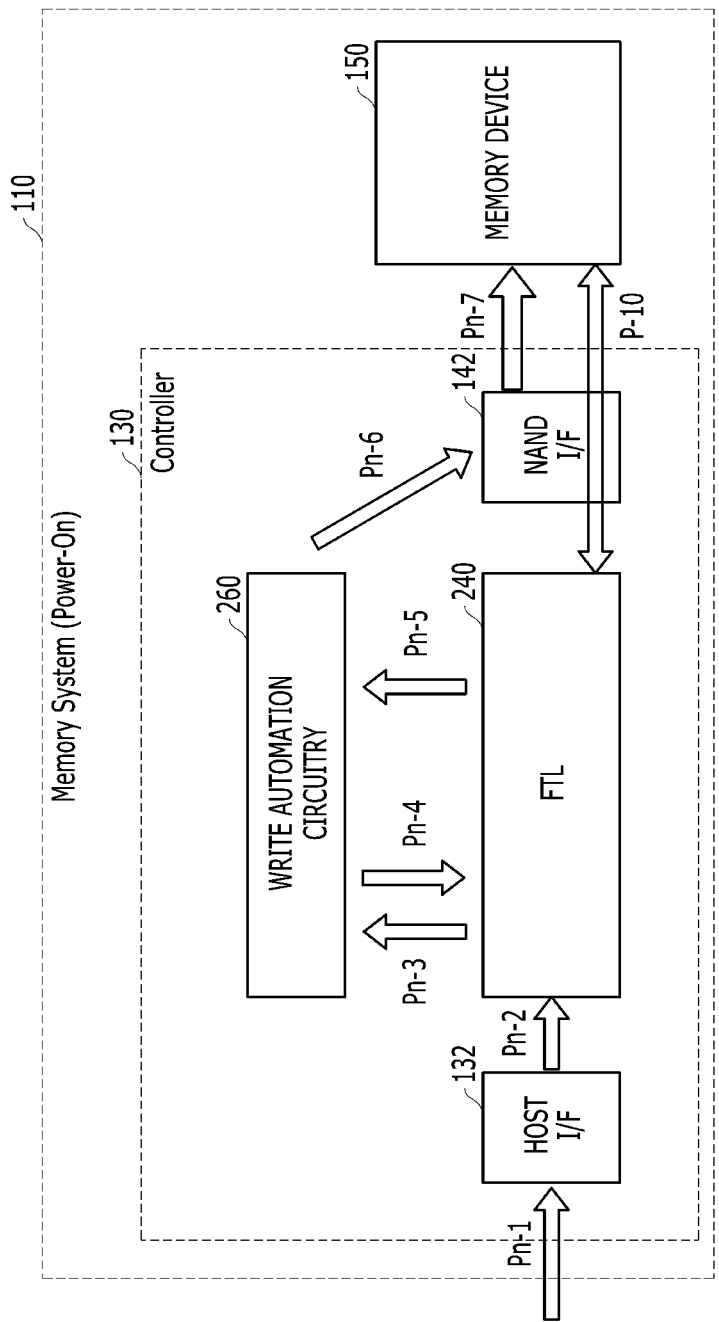
FIG. 7 illustrates a write operation of the memory system when there is no power loss according to embodiments of the present disclosure.

FIG. 7 illustrates a write operation of the memory system when there is no power loss according to an embodiment of the present disclosure.

Referring to FIG. 7, the memory system 110 can include the controller 130 and the memory device 150. The controller 130 can include the host interface 132, the flash translation layer 240, the write automation circuit 260, and the memory interface 142. In FIG. 7, how to handle or process a write operation in an operating environment in which power is stably supplied to the memory system 110 will be described as an example.

A write operation of the memory system 110 can start when the memory system 110 receives a write command input from an external device (Pn-1). The host interface 132 can recognize the write command. The host interface 132 can transmit the write command to the flash translation layer 240 (Pn-2).

According to an embodiment, the flash translation layer 240 can transmit the write command transmitted from the host interface 132 to the write automation circuit 260 (Pn-3).

The write automation circuit 260 may transmit write operation information to the flash translation layer 240 based on characteristics or attributes of an operation associated with the write command (Pn-4). For example, the write operation information could be transferred according to whether the operation needs to be performed through the flash translation layer 240 or whether the operation includes a task with intelligent control. a write operation generated from garbage collection (GC), wear-leveling (WL), metadata management for persistence, or the like might require a task with intelligent control, so that the write operation could be processed or handled through the flash translation layer 240 rather than the write automation circuit 260. For intelligent control, the flash translation layer 240 can read data stored in the memory device 150 (P-10).

Moreover, address schemes used by the host 102 and the memory device 150 can be different, and a size or amount of write data indicated by each address may be different. For example, in an address scheme used by the host 102, a size of a data block, which is the smallest unit of data, can be 512 bytes, but a page size of the memory device 150 can be 4K or 8K bytes. When a size of a write data entry input from the host 102 is smaller than the page size, the controller 130 can read other data entries stored in the memory device 150 and then combine the write data entry and the other data entries to program the write data entry in the memory device 150. This operation performed in the memory system 110 can include a task involving a Read/Modify/Write (RMW) operation. Because the write automation circuit 260 might be not suitable for performing this process or a task like the RMW operation, the flash translation layer 240 can perform the corresponding operation or task.

Referring to FIG. 1, the memory system 110 can use the flash translation layer (FTL) 240 to process or handle a write operation caused by garbage collection, unaligned write operation involving a read, modify, and write (RMW) operation, a map data update operation in which metadata for data stored in the memory device 150 is updated with a delay or conditionally, and the like. In order to secure data safety, reliability, or coherency, an unaligned write operation is different from an operation performed according to a preset pattern or a regular routine, because an order of tasks or operations and a timing of executing the tasks or the operations might vary due to a read operation (e.g., P-10) for the unaligned write operation. Further, an order of the tasks or the operations and a timing of executing the tasks or the operations can be different for adjusting a write range in which data are overlapped overall or partially and modifying a program sequence of write data which is not overlapped. In a case of such an operation, the write automation circuit 260 can transmit operation information to the flash translation layer 240 to handle or process the operation with intelligent control (Pn-4).

The flash translation layer 240 may process an operation or task with intelligent control regarding an operation transmitted from the write automation circuit 260, and then transmit information regarding the operation or task together with a processing result to the write automation circuit 260 (Pn-5). The write automation circuit 260 can collect the information transmitted from the flash translation layer 240 and the processing result and transmit collected data to the memory interface 142 in order to program the collected data in the memory device 150 (Pn-6).

In order to program the write data to a predetermined position in the memory device 150, the memory interface 142 can transfer the corresponding data to the memory device 150 through a channel (Pn-7) to store the corresponding data in a buffer of the memory device 150. After programming data transmitted from the controller 130, the memory device 150 can transmit a program operation result (e.g., success or failure) to the controller 130.

As described above, when power is stably supplied, in order to improve data input/output performance of the memory system 110, data input/output operations can be preferentially handled or processed by the write automation circuit 260. However, an operation involving intelligent control can be handled or processed through the flash translation layer 240.

Figure 8:
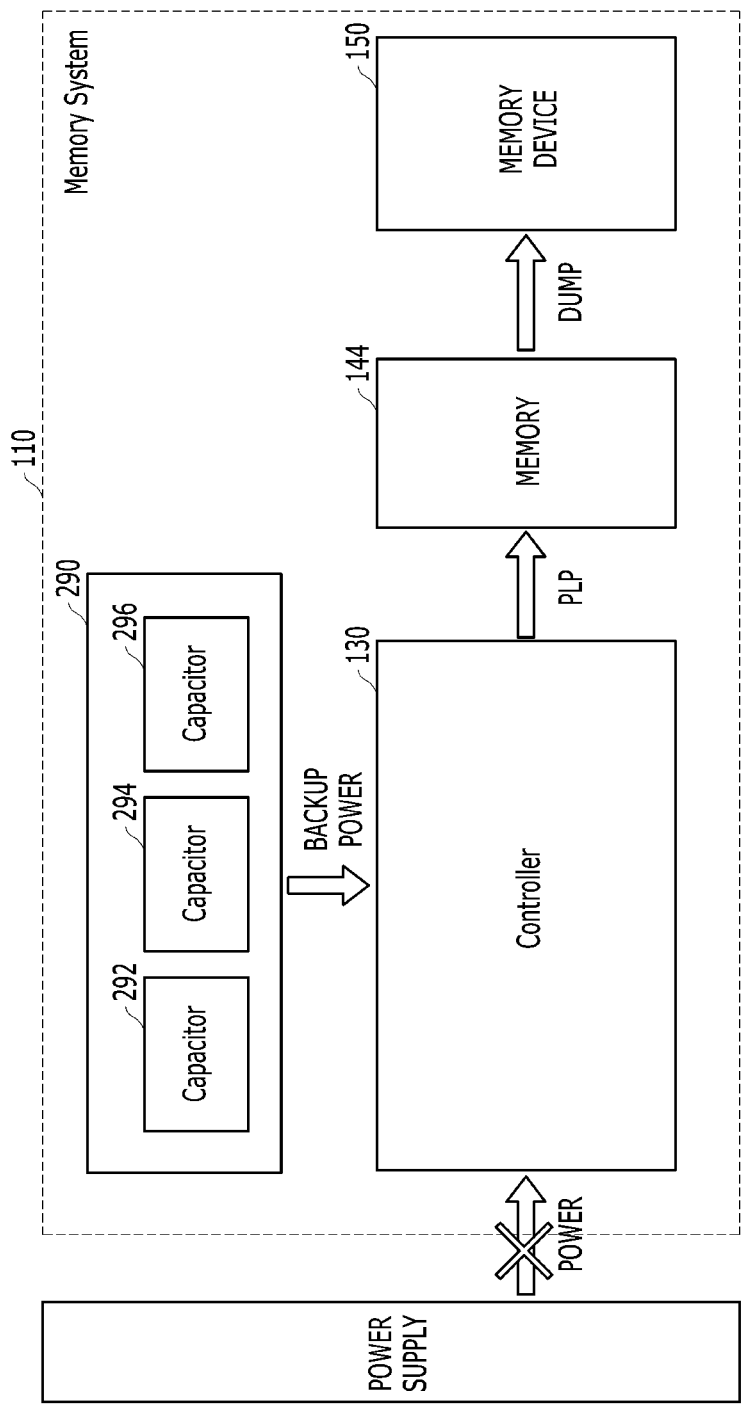
FIG. 8 illustrates power loss in a memory system according to embodiments of the present disclosure.

FIG. 8 illustrates power loss in a memory system according to an embodiment of the present disclosure.

Referring to FIG. 8, the memory system 110 can receive power from a power supply. When a problem occurs in the power supplied to the memory system 110, backup power can be supplied through the auxiliary power source 290 included in the memory system 110.

According to an embodiment, the auxiliary power source 290 may include a plurality of capacitors 292, 294, 296. The plurality of capacitors 292, 294, 296 can store electric charges while power is supplied. When the supply of power is unstable or the power is cut off, the plurality of capacitors 292, 294, 296 can supply backup power using the stored charges. The backup power can be different according to the number and capacitance of the plurality of capacitors 292, 294, 296. As a size and number of the plurality of capacitors 292, 294, 296 increases, a supply time of the backup power could also be increased.

Increasing a size of the auxiliary power source 290 for making the supply time of the backup power longer might be limited according to a size and performance of the memory system 110. Accordingly, the supply time of the backup power that can be supplied when the power supply is unstable can be limited. Because the backup power is limited, an operating speed of the controller 130 needs to be increased in order to increase a size of the backup data that the memory system 110 can store.

When the supply of power is stopped, backup power can be supplied through the auxiliary power source 290, and the controller 130 can generate an event for power-loss protection (PLP) or power-loss data protection. Information and data temporarily stored in the memory 144 can be dumped to the memory device 150. In data dumping to the memory device 150, the information and the data stored in the memory 144 could be programmed to a preset location in the memory device 150. Herein, the preset location can belong to a region in at least one memory block capable of storing information and data in response to an event for power-loss protection (PLP), like the first memory block 158 shown in FIG. 1. In order to increase a data program speed for storing more backup data, single bit data not multi-bit data can be programmed in a non-volatile memory cell included in the first memory block 158.

Figure 9:
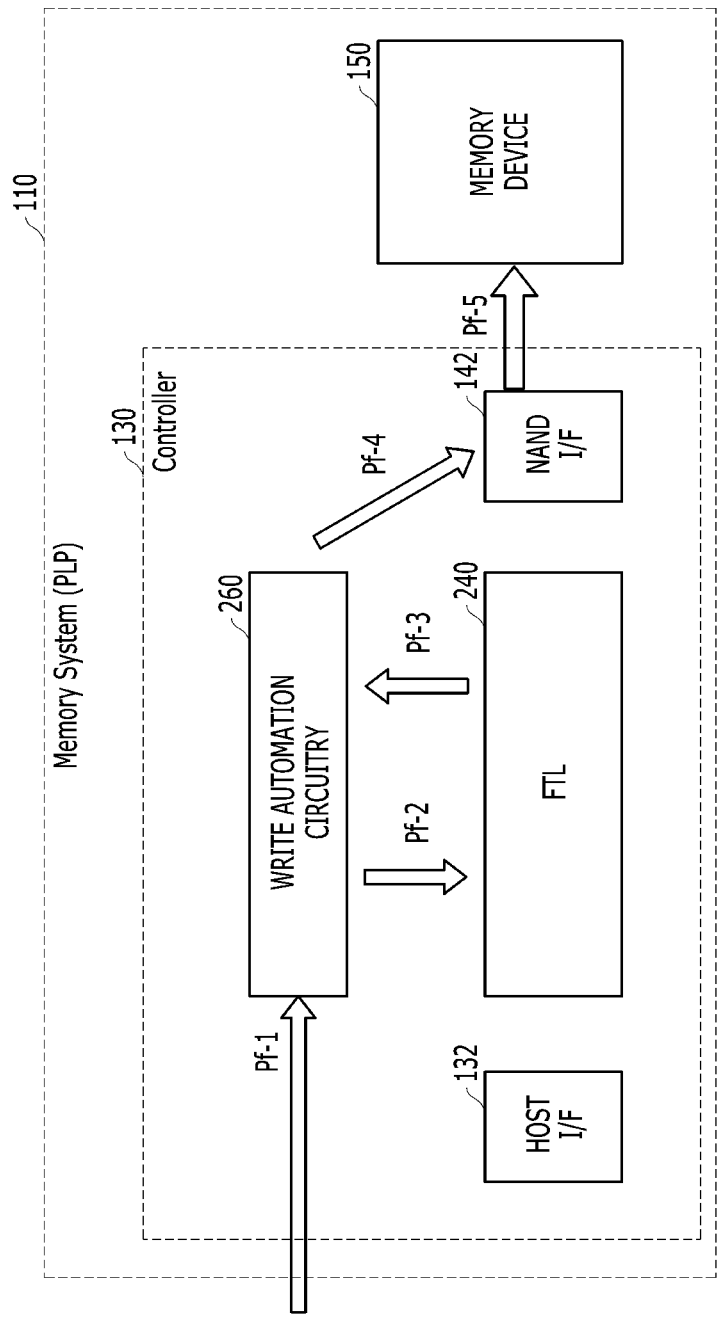
FIG. 9 illustrates a write operation of the memory system when power loss occurs according to embodiments of the present disclosure.

FIG. 9 illustrates a write operation of the memory system when power loss occurs according to an embodiment of the present disclosure. According to an embodiment, the memory system 110 illustrated in FIG. 9 may have substantially the same configuration as the memory system 110 illustrated in FIG. 7.

Referring to FIG. 9, a procedure in which the memory system 110 performs power loss protection (PLP) or power-loss data protection due to power loss will be described.

At least one write command remaining in an external device such as the host 102 can may be transmitted to the memory system 110 (Pf-1). The write automation circuit 260 can determine whether intelligent control is required in response to the transmitted write command, and then transmit an operation or task requiring intelligent control to the flash translation layer 240 (Pf-2).

The flash translation layer 240 can handle or process at least some of the operations and tasks received from the write automation circuit 260. However, as described in FIG. 8, a supply time of backup power supplied to the controller 130 after power loss occurs could be limited. Accordingly, the flash translation layer 240 can add an indicator to an operation or operation delivered from the write automation circuit 260. As shown in FIG. 1, the flash translation layer 240 may add an indicator to information regarding the corresponding operation and task based on whether the operation and task input from the write automation circuit 260 have been completely handled or processed. After adding the indicator, the flash translation layer 240 can transfer the operation or task with the indicator to the write automation circuit 260 (Pf-3). The write automation circuit 260 could insert the operation or task with the indicator to backup data for power-loss protection (PLP).

In response to an event for power-loss protection (PLP), the write automation circuit 260 can collect data or information which is not stored in the memory device 150 as well as data or information which transmitted from the flash translation layer 240. The write automation circuit 260 can transmit collected data or information to be transferred and stored in a designated memory block to the memory interface 142 (Pf-4).

The memory interface 142 can dump data and information transferred from the write automation circuit 260 to the memory device 150 while the backup power is supplied (Pf-5). The memory device 150 can program the data and the information in a specific memory block (e.g., the first memory block 158). According to an embodiment, the specific memory block can be determined by the write automation circuit 260.

Figure 10:
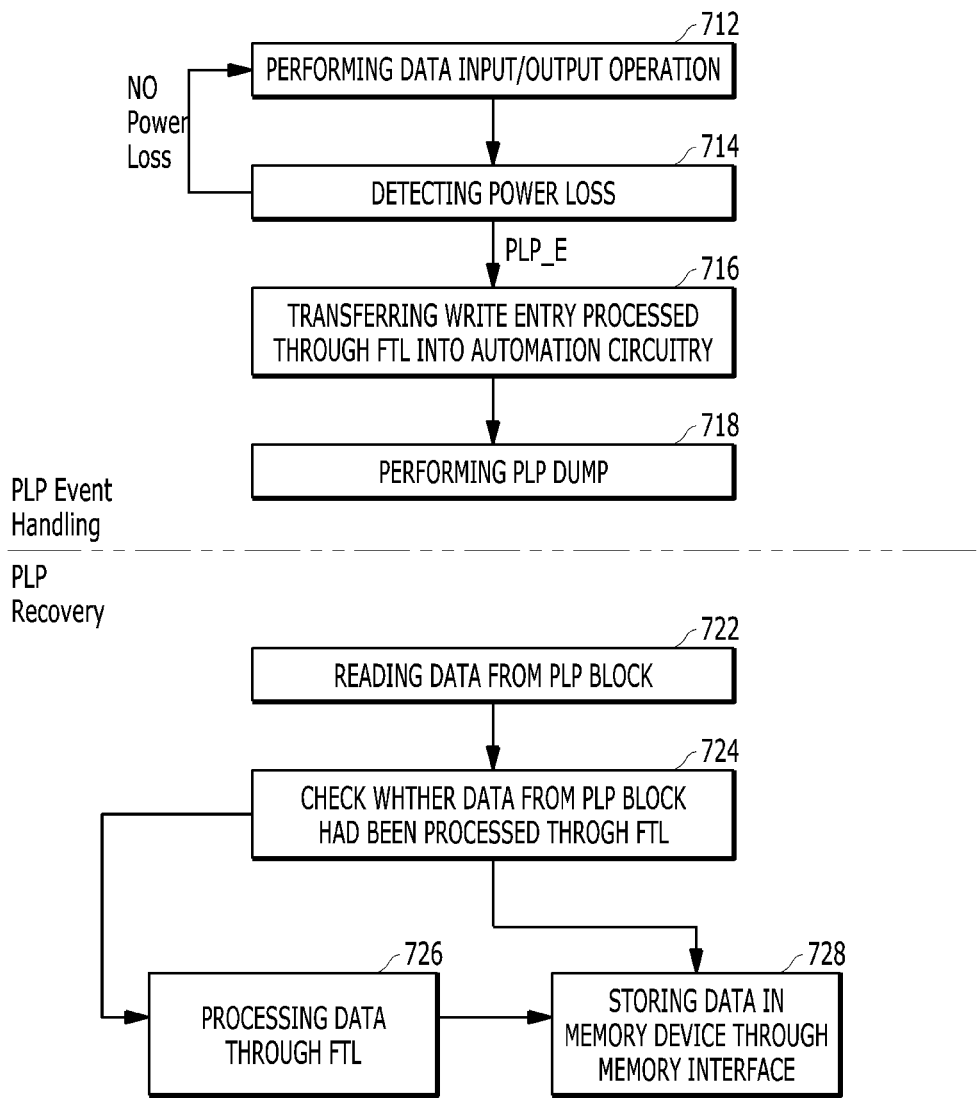
FIG. 10 illustrates a method of operating a memory system according to another embodiment of the present disclosure.

FIG. 10 illustrates a method of operating a memory system according to another embodiment of the present disclosure.

Referring to FIG. 10, in relation to power loss, the memory system 110 can perform two operations. For example, one is a procedure for handling power loss protection (PLP) events (PLP Event Handling), and the other is a procedure for data recovery (PLP recovery) following the power loss protection (PLP) that is performed when power is supplied again or resumed after power loss occurs.

The memory system 110 can perform a data input/output operation (operation 712). The memory system 110 can monitor power and detect a power loss while performing a data input/output operation (operation 714). When there is no power loss in the memory system 110 (NO Power Loss), the memory system 110 can continue to perform the data input/output operation (operation 712).

When power loss is detected in the memory system 110, the memory system 110 can generate an event PLP_E for power loss protection (PLP). In order to process a power loss protection event (PLP Event), the memory system 110 can transmit a task or a write entry, which is handled or processed with intelligent control by the flash translation layer 240, to the write automation circuit 260 (operation 716).

The memory system 110 can dump data and information for the power loss protection (PLP) to a specific memory block (PLP Block) in the memory device 150 while the backup power is supplied (operation 718). The memory device 150 can program dumped data and information in the specific memory block (PLP Block) to complete an operation in response to a power loss protection event (PLP Event).

When power is supplied again or resumed to the memory system 110 after power loss, the memory system 110 can read data programmed in a specific memory block (PLP Block) of the memory device 150 (operation 722). After the power is supplied again to the memory system 110, the memory system 110 can return to a state before power loss. Further, an external device (e.g., the host 102) interworking with the memory system 110 can expect that commands and data transmitted to the memory system 110 are normally handled, processed, or stored therein. After reading data stored in the specific memory block (PLP Block), the memory system 110 can handle and process the data for recovery or restoration.

The memory system 110 can check whether backup data or information had been completely handled or processed in the flash translation layer 240 based on an indicator corresponding to the backup data or information read from the specific memory block (PLP Block) (operation 724). When it is determined that the backup information or data are not completely handled or processed in the flash translation layer 240 based on the indicator, the memory system 110 can use the flash translation layer 240 to handle or process the backup information or data with intelligent control (operation 726).

After processing of the corresponding data or information through the flash translation layer 240 are done, processed data or information can be transferred to the write automation circuit 260. The write automation circuit 260 in the memory system 110 can store processed data or information in the memory device 150 through the memory interface 142 (operation 728).

On the other hand, if it is determined that information or data read from the specific memory block (PLP Block) need not be processed or handled with intelligent control through the flash translation layer 240 based on the indicator, the write automation circuit 260 in the memory system 110 can store or program the information or data in the memory device 150 through the memory interface 142 (operation 728).

While the memory system 110 can perform data recovery for power loss protection (PLP), recovered data or information can be programmed in a memory block other than the specific memory block (PLP Block) used for power loss protection (PLP) of the memory device 150. The memory block storing the recovered data or information can include a non-volatile memory cell capable of storing multi-bit data.

Figure 11:
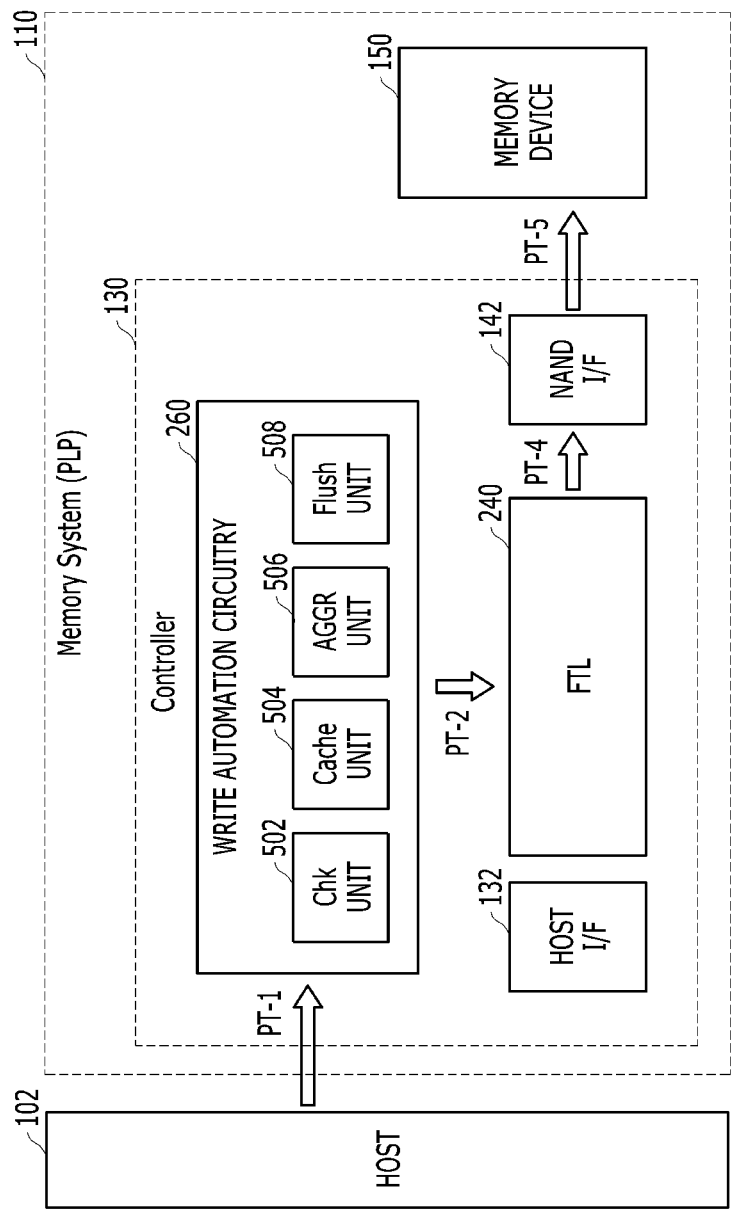
FIG. 11 illustrates a memory system according to another embodiment of the present invention.

FIG. 11 illustrates a memory system according to another embodiment of the present invention.

Referring to FIG. 11, the memory system 110 can perform data communication for a data input/output operation with the host 102. The memory system 110 can include the controller 130 and the memory device 150. The controller 130 can include a write automation circuit 260. Hereinafter, regarding components in the memory system 110 described in FIG. 11, differences from those in other embodiments shown in FIGS. 1 to 10 will be mainly described.

According to an embodiment, the write automation circuit 260 can include a plurality of processing units 502, 504, 506, 508. Herein, the plurality of processing units 502, 504, 506, 508 can include an application-specific integrated circuit (ASIC) designed for performing a specific operation. According to an embodiment, each processing unit can be implemented in a processor, a co-processor, a micro-processor, an accelerator, or the like designed to handle a specific task. According to another embodiment, the plurality of processing units 502, 504, 506, 508 can be implemented in a multi-processor or a multi-core processor. Targeted adaptive design for the plurality of processing units 502, 504, 506, 508 used for performing specific operations can reduce power consumption, and the memory system 110 can have good performance regarding the data input/output operations.

For example, the write automation circuit 260 can include a first processing unit 502, a second processing unit 504, a third processing unit 506, and a fourth processing unit 508. The first processing unit 502 can check whether a logical page number (LPN) transmitted from the host 102, which is an external device, belongs to a target of a background trim operation. Typically, a trim command is a type of an Advanced Technology Attachment (ATA) command used by the host 102 to inform the memory system 110 of a data range that can be erased because it is no longer used. Because the data range transmitted along with the trim command does not need to be programmed or backed up in the memory device 150 of the memory system 110, data belonging to the corresponding data range could be excluded from write data to be programmed in the memory device 150. Accordingly, the memory system 110 might not perform a program operation regarding invalid, invalidated, or unnecessary data. An amount of write data can be adjusted through a background trim operation performed by the controller 130.

The second processing unit 504 can check whether there is write data transmitted previously in response to the same logical address as a logical page number (LPN) transmitted from the host 102. The host 102 can transmit plural write commands along with different write data but the same logical address LPN. In this case, the memory system 110 might not have to store or program old write data in the memory device 150. The most recent write data could be valid and have a value to be programmed in the memory device 150. Also, when a size or an amount of write data is smaller than the minimum size of data programmed once in the memory device 150, the write data can be temporarily stored in a memory or a storage (e.g., a queue).

According to an embodiment, the second processing unit 504 can determine whether the size of write data corresponding to a logical page number (LPN) transmitted from the host 102, which is an external device, is different from a preset criterion or a threshold (e.g., whether size adjustment of the write data is necessary). For example, data can be programmed in the memory device 150 in a unit of 1M bytes, and write data transmitted from the host 102 can have a size of 1.5M bytes. Write data of 1.5M bytes can be divided into two write data of 1M bytes and 0.5M bytes. The write data of 0.5M bytes can be combined with other write data or dummy data to be programmed in the memory device 150. According to an embodiment, the second processing unit 504 can compare at least one write data entry with a page size of the memory device 150 and divide or combine the at least one write data entry to plural data corresponding to the page size.

The third processing device 506 can sequentially store write data entries to be stored in the memory device 150 in a storage device having a preset size. For example, the third processing unit 506 can manage write data entries through a queue, sequentially add a write data entry to the queue, and check whether an amount of the write data entries accumulated in the queue reaches a threshold such as a suitable size or a programmable size of the memory device 150. According to an embodiment, the threshold, which is a programmable size in the memory device 150, can correspond to an amount of flushed data in the memory device 150 e.g., an amount of data in data flushing operation.

When determining that there is write data to be programmed in the memory device 150 processed by the third processing unit 506, the fourth processing unit 508 can prepare the write data suitable for a data communication protocol (e.g., Open NAND Flash Interface (ONFi), toggle mode, etc.) to transmit the write data to the memory device 150. According to an embodiment, the fourth processing unit 508 can transfer processed write data along with program operation information to the memory interface 142. According to another embodiment, the fourth processing unit 508 can put prepared write data in a queue, and the memory interface 142 get the prepared write data from the queue.

When there is a plurality of write data entries associated with a same logical address LPN, the write automation circuit 260 can invalidate old write data entries and allow only the most recent write data entry to be programmed in the memory device 150. For example, a spare area associated with a write data entry invalidated by the write automation circuit 260 could be a mark or an indication showing dummy data. Thereafter, the controller 130 can control the invalidated write data entry not to be reflected in metadata.

Even though a power loss occurs, the write automation circuit 260 can check whether a same logical address LPN associated with write data entries is repeated during the power-loss protection (PLP). The write automation circuit 260 can invalidate an old write data entry associated with a repeated logical address and mark the old write data entry as dummy data in a spare area of the corresponding write data entry. Mapping information regarding a write data entry indicated as dummy data might not be included in metadata for the power-loss protection (PLP).

In response to power loss, when transferring the remaining write commands and write data to be stored in the memory system 110, the host 102 can transmit a barrier message, indicating that all write commands and write data have been transferred (PT-1), to the memory system 110. After performing the above-described operation on the write data transferred from the host 102, the write automation circuit 260 can transmit the barrier message of the host 102 to the flash translation layer (FTL) 240 (PT-2). After performing an operation for power-loss protection (PLP), the flash translation layer (FTL) 240 can determine the most recent write data entry to be stored in the memory device 150 in response to the barrier message and transfer the most recent write data to the memory interface 142 (PT-4). In order for the memory device 150 to completely perform a program operation, the memory interface 142 can transmit the most recent write data entry to the memory device 150 (PT-5).

Through the above-described processes, even when performing a data dump for power-loss protection (PLP), the write automation circuit 260 can invalidate unnecessary data or redundant data. Accordingly, the write automation circuit 260 can store only valid data in the memory device 150 irrespective of a transmission order of the write data and the write commands input from the host 102.

As above described, a system according to an embodiment of the present disclosure can reduce the number or size of capacitors used as internal auxiliary power source, thereby reducing the size of the system, while maintaining performance of the power-loss protection (PLP).

A memory system according to an embodiment of the present disclosure can perform a recovery operation or restoration operation when power is supplied after power loss based on the power-loss protection (PLP) regarding write data processed or handled before power loss, thereby improving data safety and reliability of the memory system.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments, may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments, may transform the computer, processor, controller, or other signal processing device into a special-purpose processor for performing the methods described herein.

While the present teachings have been illustrated and described with respect to specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory system comprising:
a memory device including a first memory block used for power-loss data protection; and
a controller coupled to the memory device, the controller including a hardware layer and a firmware layer, the hardware layer configured to:
check whether at least one write data entry input from an external device to be programmed in the memory device belongs to a programmable range in the memory device after power loss occurs,
determine whether a logical address associated with the at least one write data entry is repeated, and
program the at least one write data entry in the first memory block after the checking and the determining, wherein:
the firmware layer is configured to process a write data entry for a program operation, and
the controller is configured to set an identifier to the write data entry completely processed by the firmware layer.

2. The memory system according to claim 1, wherein the hardware layer comprises:
a first processor configured to determine whether the at least one write data entry belong to the programmable range;
a second processor configured to determine whether the logical address associated with the at least one write data entry is repeated, set a tag to a write data entry associated with an old logical address of repeated logical addresses, divide or combine the at least one data entry to correspond to a program operation unit;
a third processor configured to exclude the write data entry with the tag from a program data group and output the program data group of which size or amount is equal to or less than a threshold established for the memory device to perform a program operation for the power-loss data protection; and
a fourth processor configured to transfer the program data group output from the third processor to a physical layer for transmission to the memory device.

3. The memory system according to claim 2,
wherein the hardware layer is further configured to receive a barrier message informing that all write data entries associated with the power-loss data protection have been transmitted, and transmit the barrier message to the firmware layer, and
wherein the firmware layer is configured to determine whether a pending data entry is associated with the power-loss data protection in response to the barrier message and transfer the pending data entry to the hardware layer when the pending data entry is associated with the power-loss data protection.

4. The memory system according to claim 1, wherein the first memory block comprises plural pages, each page including a data region storing the write data entry and a spare region storing the identifier corresponding to the write data entry, the data region including plural memory cells, each memory cell storing 1-bit data.

5. The memory system according to claim 1,
wherein the hardware layer is further configured to determine whether data coherency regarding a data entry is checked during a data input/output operation when no power loss occurs,
wherein the firmware layer is configured to process the data entry for a read operation or a program operation when the data coherency regarding the write data entry is checked, and
wherein the hardware layer is further configured to process the data entry for the read operation or the program operation when the data coherency regarding the data entry is not checked.

6. The memory system according to claim 5, wherein the data entry regarding the data coherency which is to be checked is associated with at least one of:
a program operation following garbage collection;
an unaligned program operation involving a Read/Modify/Write (RMW) operation; and
a map data operation for updating, with a delay or conditionally, metadata which is stored in the memory device.

7. The memory system according to claim 5, wherein the hardware layer is further configured to complete, when no power loss occurs, the data input/output operation regarding the data entry after the firmware layer processes the data coherency regarding the data entry.

8. The memory system according to claim 1, wherein a program operation regarding the at least one write data entry involves at least one of a map update or journaling, and the hardware layer or the firmware layer is further configured to perform the map update or the journaling.

9. The memory system according to claim 1, wherein the hardware layer and the firmware layer are further configured to check a descriptor used for sharing information regarding the at least one write data entry to recognize handling, transfer, allocation, or release of the at least one write data entry.

10. The memory system according to claim 1, further comprising an auxiliary power supply unit configured to supply auxiliary power to the controller and the memory device when the power loss occurs.

11. The memory system according to claim 1, wherein the hardware layer is further configured to store the at least one write data entry in the memory device, when the at least one write data entry is input from an external device and an early completion regarding the at least one write data entry is transmitted to the external device before the power loss occurs.

12. The memory system according to claim 11, wherein the controller transmits the early completion to the external device for the at least one write data entry which belongs to the programmable range which is preset for securely programming a size or an amount of write data in the memory device even though the power loss occurs.

13. The memory system according to claim 1,
wherein the controller is configured to read, when power is resumed after the power loss, the at least one write data entry and the identifier associated with the at least one write data entry from the first memory block, and
wherein the controller is further configured to use at least one of the hardware layer or the firmware layer to perform a recovery operation regarding the at least one write data entry based on the identifier.

14. The memory system according to claim 13,
wherein the memory device further comprises a second memory block including plural memory cells, each memory cell storing multi-bit data, and
wherein the controller is further configured to program, in the second memory block, a write data entry generated through the recovery operation.

15. A method for operating a memory system, the method comprising:
performing a data input/output operation through a hardware layer and a firmware layer; and
programming, through the hardware layer, at least one write data entry in a designated memory block, after checking whether the at least one write data entry input from an external device to be programmed in the memory device belongs to a programmable range in the memory device after power loss occurs and determining whether a logical address associated with the at least one write data entry is repeated,
wherein the programming comprises:
generating an event for power-loss data protection after power loss occurs;
transferring information regarding a data input/output operation associated with a write data entry processed from the firmware layer to the hardware layer in response to the event;
setting an identifier to the write data entry when the write data entry is completely processed for a program operation through the firmware layer; and
programming the at least one write data entry, including the write data entry, collected by the hardware layer in the designated memory block.

16. The method according to claim 15, wherein the programming comprises:
determining whether the at least one write data entry belongs to the programmable range;
determining whether the logical address associated with the at least one write data entry is repeated;
setting a tag to a write data entry associated with an old logical address of repeated logical addresses;
dividing or combining the at least one data entry to correspond to a program operation unit;
excluding the write data entry with the tag from a program data group;
outputting the program data group of which size or amount is equal to or less than a threshold established for the memory device to perform a program operation for the power-loss data protection; and
transferring the program data group to a physical layer for transmission to the memory device.

17. The method according to claim 16, further comprising:
receiving, through the hardware layer, a barrier message informing that all write data entries associated with the power-loss data protection have been transmitted to transmit the barrier message to the firmware layer; and
determining, the firmware layer, whether a pending data entry is associated with the power-loss data protection in response to the barrier message to transfer the pending data entry to the hardware layer when the pending data entry is associated with the power-loss data protection.

18. The method according to claim 15, further comprising recovering the at least one write data entry stored in the designated memory block when power is resumed after the power loss,
wherein the recovering comprises:
reading, when power is resumed after the power loss, the at least one write data entry and the identifier associated with the at least one write data entry from the designated memory block; and
performing a recovery operation regarding the at least one write data entry through the hardware layer or the firmware layer based on the identifier.

* * * * *